(12) United States Patent
Kodama et al.

(10) Patent No.: US 9,544,405 B1
(45) Date of Patent: Jan. 10, 2017

(54) METHOD AND APPARATUS FOR WIRED AND WIRELESS COMMUNICATION

(71) Applicant: SONY MOBILE COMMUNICATIONS INC., Tokyo (JP)

(72) Inventors: Kenichiro Kodama, Tokyo (JP); Tomoo Kobayashi, Tokyo (JP); Tomokazu Fujiwara, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/841,279

(22) Filed: Aug. 31, 2015

(51) Int. Cl.
| | |
|---|---|
| *H04B 3/56* | (2006.01) |
| *H04M 3/18* | (2006.01) |
| *H04M 1/02* | (2006.01) |
| *H01R 24/60* | (2011.01) |
| *H01R 24/58* | (2011.01) |
| *H01R 107/00* | (2006.01) |

(52) U.S. Cl.
CPC ............... *H04M 1/02* (2013.01); *H01R 24/58* (2013.01); *H01R 24/60* (2013.01); *H01R 2107/00* (2013.01)

(58) Field of Classification Search
CPC ............ H01L 2224/16245; H01L 2224/73257; H01L 23/3121; H01L 23/49562; H01L 23/49575; H01L 23/60; H01L 24/16; H01L 24/48; H01L 24/49; H01L 27/0255; H01L 27/0688; H01L 2924/3011; H01L 31/02021; H02M 1/44
See application file for complete search history.

(56) References Cited

U.S. PATENT DOCUMENTS

| | | | | |
|---|---|---|---|---|
| 4,626,954 A | * | 12/1986 | Damiano | H02M 5/293 361/96 |
| 6,336,155 B1 | * | 1/2002 | Ito | G06F 3/1293 710/36 |
| 2014/0322953 A1 | * | 10/2014 | Katayanagi | H01R 13/6582 439/353 |
| 2015/0325955 A1 | * | 11/2015 | Chien | H01R 13/6581 439/607.25 |

FOREIGN PATENT DOCUMENTS

JP  8-147080 A  6/1996

* cited by examiner

*Primary Examiner* — Quan M Hua
(74) *Attorney, Agent, or Firm* — Oblon, McClelland, Maier & Neustadt, L.L.P.

(57) ABSTRACT

Aspects of the disclosure provide a terminal device that includes an antenna element and an interface component. The antenna element is mounted on a casing of the terminal device to transmit/receive electromagnetic waves. The interface component is configured to couple an external device with the terminal device for a wired transmission. The interface component includes a metal shell configured to have a fixed potential state to shield the wired transmission from noise when the interface component is active for the wired transmission, and to have a floating state to avoid affecting the antenna element for transmitting/receiving electromagnetic waves when the interface component is idle.

14 Claims, 5 Drawing Sheets

METHOD AND APPARATUS FOR WIRED AND WIRELESS COMMUNICATION

TECHNICAL FIELD

This disclosure is related with an apparatus with an antenna element for wireless communication and an interface component for wired communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A user of a terminal device, such as a smart phone, a tablet computer, and the like, may desire a terminal device of a relatively smaller size for portable convenience. To reduce size, components of the terminal device can be closely arranged with high density.

SUMMARY

Aspects of the disclosure provide a terminal device that includes an antenna element and an interface component. The antenna element is mounted on a casing of the terminal device to transmit/receive electromagnetic waves. The interface component is configured to couple an external device with the terminal device for a wired transmission. The interface component includes a metal shell configured to have a fixed potential state to shield the wired transmission from noise when the interface component is active for the wired transmission, and to have a floating state to avoid affecting the antenna element for transmitting/receiving electromagnetic waves when the interface component is idle.

In an embodiment, the terminal device includes a switch configured to connect the metal shell to a ground portion of the terminal device when the interface component is active, and disconnect the metal shell from the ground portion to float the metal shell when the interface component is idle. In an example, the terminal device includes a detecting and controlling circuit configured to detect a state of the interface component and control the switch based on the state of the interface component. In another embodiment, the terminal device includes a plurality of switches that are distributed and connected with the metal shell in parallel to connect the metal shell to the ground portion of the terminal device when the interface component is active, and disconnect the metal shell from the ground portion of the terminal device to float the metal shell when the interface component is idle.

In an example, the interface component is a Universal Serial Bus (USB) receptacle for coupling a USB plug in connection with the external device. In another example, the interface component is a headphone socket for coupling an audio plug.

In an example, the interface component is surrounded with isolation by a metal panel that forms the antenna element.

Aspects of the disclosure provide a method for use in a terminal device. The method includes switching a metal shell for an interface component of the terminal device to a fixed potential to shield a wired transmission from noise when the interface component is active to conduct the wired transmission between the terminal device and an external device, and switching the metal shell away from the fixed potential to float the metal shell when the interface component is idle to avoid affecting an antenna element of the terminal device for transmitting/receiving electromagnetic waves.

Aspects of the disclosure provide an electronic device that includes an antenna element and an interface component. The antenna element is configured to transmit/receive electromagnetic waves for wireless communication. The interface component is configured to couple an external device with the electronic device for wired communication. The interface component includes a metal shell configured to have a fixed potential to shield the wired communication from noise when the interface component is active for the wired communication, and to have a floating state to avoid affecting the antenna element for the wireless communication when the interface component is idle.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
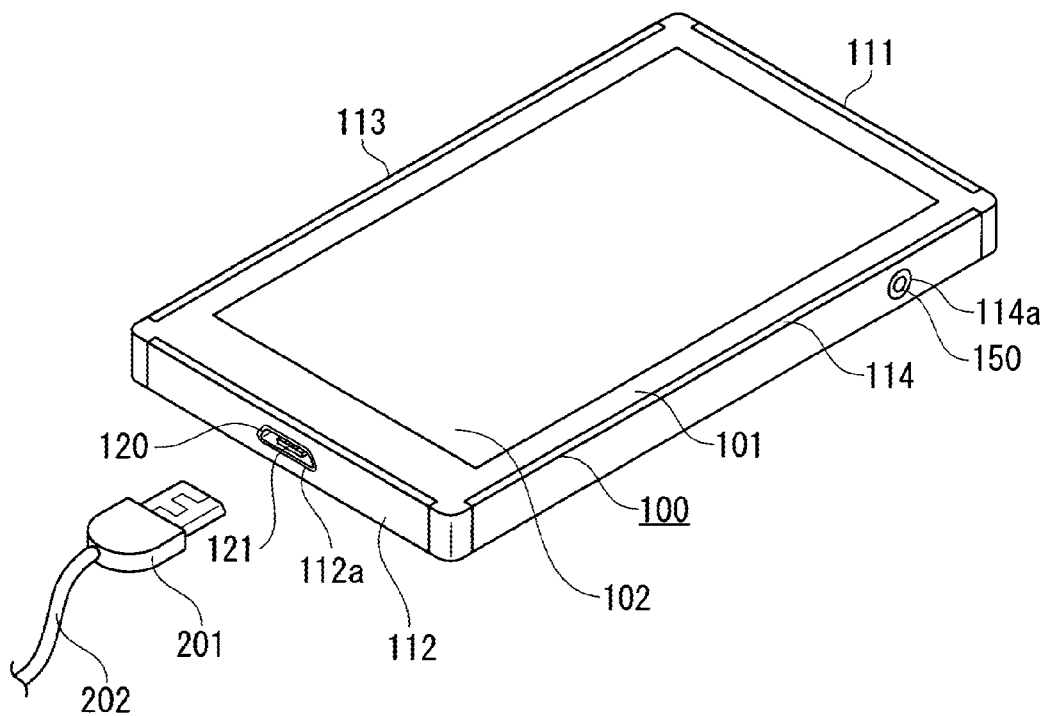
FIG. 1 shows a schematic diagram of a terminal device 100 according to an embodiment of the disclosure.

FIG. 1 shows a schematic diagram of a terminal device 100 according to an embodiment of the disclosure. The terminal device 100 includes at least an antenna element and an interface component for wireless and wired communication. The antenna element and the interface component are arranged in close proximity with isolation from each other. In an example, the antenna element is configured for wireless communication using electromagnetic waves and the interface component is configured for wired communication between the terminal device 100 and an external device. The interface component includes a metal shell configured to have a fixed potential (e.g., ground level) when the interface component is active for the wired communication and to be floated when the interface component is idle to improve the wireless communication performance.

The terminal device 100 can be any suitable electronic device, such as a smart phone, a tablet computer, a media player, a smart TV, a personal computer, a laptop computer, a router, a network switch, a modem, and the like that includes an antenna element for wireless communication and an interface component for wired communication.

In the FIG. 1 example, the terminal device 100 is a smart phone. The terminal device 100 includes a display 102 arranged at a front surface of the terminal device 100. Further, the terminal device 100 includes a plurality of antenna elements 112-114, such as metal panels, metal bars, and the like. In the FIG. 1 example, the terminal device 100 includes a casing 101 for holding various components. The antenna elements 112-114 are mounted on the surface of the casing 101 to transmit/receive electromagnetic waves for wireless communication. It is noted that, in another example, the antenna elements 112-114 can be mounted inside the casing 101.

In an example, the antenna elements 111-114 are configured to function as independent antennas. For example, the antenna element 111 and the antenna element 112 are respectively configured to perform wireless communications with base stations for radio telephony communication. In an example, one of the antenna element 111 and the antenna element 112 is selected at a time for a radio telephone communication based on, for example, signal strength.

Further, in the example, one of the antenna element 113 and the antenna element 114 is configured to perform wireless communication with access points in a wireless local area network (LAN), and the other is configured to perform Bluetooth based wireless communication.

Further, the terminal device 100 includes one or more interface components for wired communication. The interface components can be mechanically and electrically coupled with corresponding external interface components for wired signal transmission. In an example, due to size reduction, the one or more interface components are arranged in close proximity with the antenna elements 112-114. In the FIG. 1 example, the antenna element 112 has a hole 112a in the approximate center of a metal panel that forms the antenna element 112, and the terminal device 100 includes a Universal Serial Bus (USB) receptacle 120 arranged to couple an external USB plug through the hole 112a. The antenna element 112 and the USB receptacle 120 are electrically isolated, for example, by an isolation layer around the hole 112a, but can affect each other, due to for example capacitive coupling, and the like.

In another example, the antenna element 112 and the USB receptacle 120 are arranged adjacent to each other in close proximity.

According to an aspect of the disclosure, the USB receptacle 120 is an interface component configured according to a USB standard. According to the USB standard, a USB plug, such as a USB plug 201 in connection with an external device (e.g., a laptop computer, and the like, not shown) by a cable 202, can be plugged in the USB receptacle 120 to be mechanically and electrically coupled with the USB receptacle 120, such that the terminal device 100 is wire-connected with the external device. Then, wired data transmission can be performed between the terminal device 100 and the external device via the USB receptacle 120 and the USB plug 201.

It is noted that, in an example, the USB receptacle 120 receives a power supply from the external device via the USB plug 201, and the power supply is used to charge the terminal device 100.

Further, in the FIG. 1 example, the antenna element 114 has a hole 114a in the approximate center of the antenna element 114. The terminal device 100 includes a headset socket 150 arranged to couple an external audio plug (not shown) through the hole 114a. In an example, when the headset socket 150 and a headset plug in connection with a headphone are mechanically and electrically coupled together, audio signals can be transmitted from the terminal device 100 to the headphone which converts the audio signals into sound waves.

According to an aspect of the disclosure, an antenna component for wireless communication and an interface component for wired communication are in close proximity in the terminal device 100. To improve the quality of the wireless communication and the quality of the wired communication, a metal shell of the interface component is configured in different states based on an active/idle state of the interface component. In an embodiment, when the interface component is in an active state for conducting a wired communication, the metal shell of the interface component is configured in a first state having a fixed potential to shield noise from affecting the wired communication. When the interface component is in an idle state without conducting a wired communication, the metal shell of the interface component is configured in a second state to be floated to avoid affecting a wireless communication conducted by the antenna component.

Figure 2:
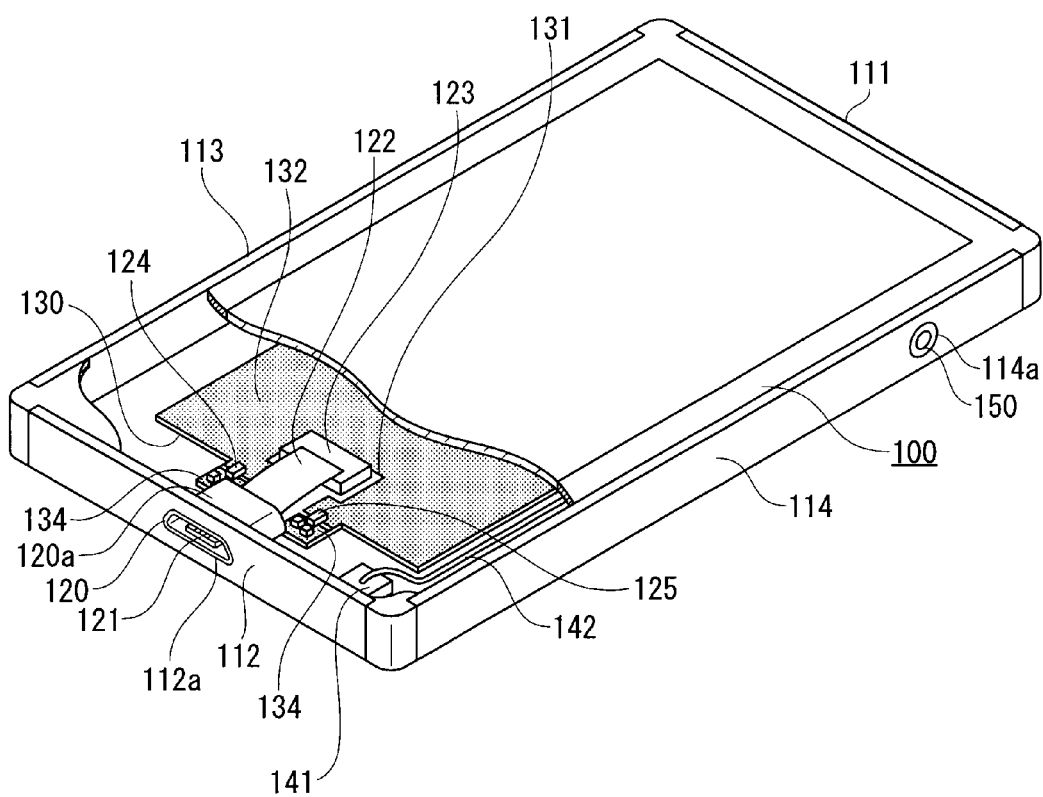
FIG. 2 shows a schematic diagram with an inside view for the terminal device 100 according to an embodiment of the disclosure.

FIG. 2 shows a schematic diagram with an inside view for the terminal device 100 according to an embodiment of the disclosure. As shown in FIG. 1 and FIG. 2, the USB receptacle 120 includes terminal pins 121 and a metal shell 120a. The terminal pins 121 are enclosed by the metal shell 120a. Inside the terminal device 100, as shown by FIG. 2, the terminal pins 121 are connected to a socket 123 via a cable 122. The socket 123 is suitably coupled to internal circuits of the terminal device 100.

In the FIG. 2 example, the terminal device 100 includes a printed circuit board (PCB) 130 on which various circuit components can be mounted. For example, a pin header 131 is mounted on the PCB 130. The pin header 131 is coupled to, for example, an integrated circuit (IC) chip (not shown), mounted on the PCB 130, via printed metal lines on the PCB 130. Further, the pin header 131 is suitably coupled with the socket 123, such that the terminal pins 121 are connected with the IC chip (not shown) mounted on the PCB 130. The IC chip includes various circuits, such as a circuitry configured to operate according to a USB standard.

Further, in the FIG. 2 example, the PCB 130 includes one or more switches 124-125 coupled between the metal shell 120a and a ground portion 132 of the PCB 130. The ground portion 132 of the PCB 130 provides a ground potential during operation. In an example, the IC chip provides control signals to the switches 124-125 to connect the metal shell 120a with the ground portion 132 or to disconnect the metal shell 120a with the ground portion 132. In an example, multiple switches are arranged in parallel between the metal shell 120a and the ground portion 132 of the PCB 130. The multiple switches can be distributed such that the potential on the metal shell 120a is relatively uniform, for example when the switches 124-125 are configured to connect the metal shell 120a to the ground portion 132.

According to an aspect of the disclosure, the IC chip (not shown) mounted on the PCB 130 includes a detecting and controlling circuit configured to detect a state of the USB receptacle 120, and to control the switches 124 and 125 based on the state of the USB receptacle 120. In an example, when the USB plug 201 in connection with an external device is plugged in the USB receptacle 120, the external device causes state changes (e.g., potential changes) on one or more of the terminal pins 121. The detecting and controlling circuit detects the state changes, and determines that the USB receptacle 120 enters the active state for wired data transmission. Then, the detecting and controlling circuit provides control signals to the switches 124 and 125 to connect the metal shell 120a with the ground portion 132. Thus, the metal shell 120a has the ground potential to shield noise from affecting the wired data transmission.

In the example, when the USB plug 201 is not plugged in the USB receptacle 120 or when the data transmission is not active, the USB receptacle 120 enters an idle state. In an example, in the idle state, one or more pins of the terminal pins 121 have a state, such as a high impedance state, and the like indicative of the idle state. The detecting and controlling circuit detects the state, and determines that the USB receptacle 120 is idle. Then, the detecting and controlling circuits provide control signals to the switches 124 and 125 to disconnect the metal shell 120a from the ground portion 132. In an example, the switches 124 and 125 switch the metal shell 120a to connect with floating elements (Z) in the terminal device 100. Thus, the metal shell 120a does not affect the wireless communication conducted by the antenna element 112.

Figure 3A:
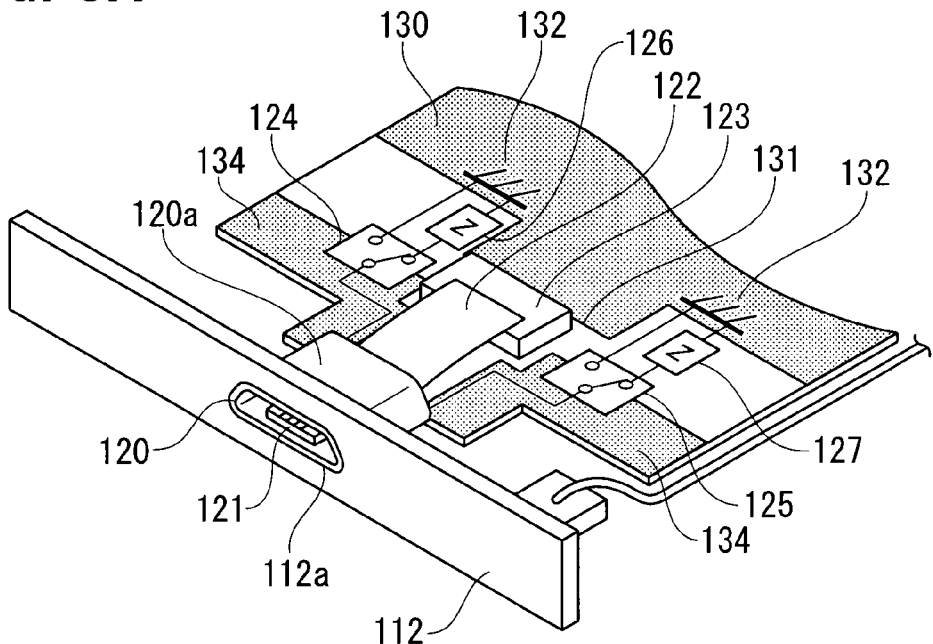
FIGS. 3A-3B show schematic diagrams for components arrangement inside the terminal device 100 according to an embodiment of the disclosure.
Figure 3B:
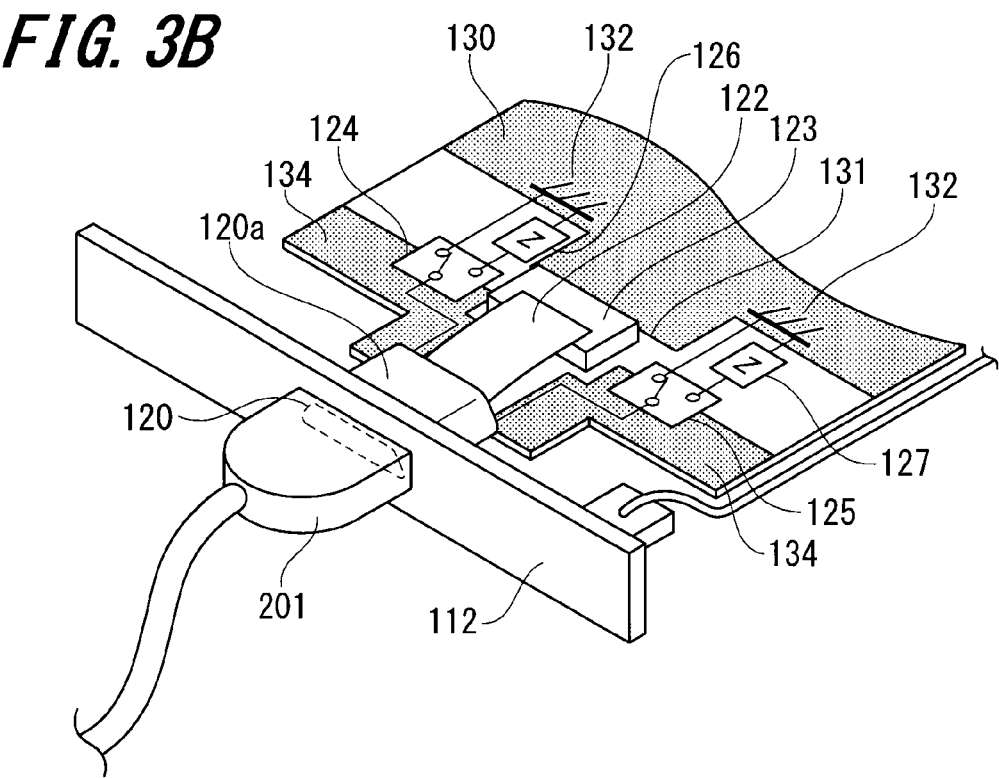

FIG. 3A shows a schematic diagram when no USB plug is plugged in the receptacle 120 and FIG. 3B shows a schematic diagram when the USB plug 201 is plugged in the receptacle 120 according to an embodiment of the disclosure.

As shown in FIGS. 3A and 3B, two switches 124 and 125 are arranged between a ground portion 132 of the PCB 130, and a receptacle connection part 134 of the PCB 130. The receptacle connection part 134 is electrically connected with the metal shell 120a.

As shown in FIGS. 3A and 3B, the two switches 124 and 125 are arranged at the left end and right end of the metal shell 120a to uniform the potential on the metal shell 120a when the metal shell 120a is connected to the ground portion 132. The switches 124 and 125 switch between a first state which directly connects the metal shell 120a to the ground portion 132, and a second state which connects the metal shell 120a to floating elements 126 and 127.

In the FIG. 3A and FIG. 3B example, the antenna element 112 is connected to a coaxial cable 142 through a power feeding portion 141. The coaxial cable 142 is connected to a high frequency communication circuit not shown.

As shown in FIG. 3A, when no USB plug is plugged in the USB receptacle 120, the USB receptacle 120 enters an idle state. In an example, the terminal pins 121 have states that are indicative of the idle state. The detecting and controlling circuit in the IC chip mounted on the PCB 130 can detect the states of the terminal pins 121 and determine that the USB receptacle 120 is idle. In an example, the detecting and controlling circuit in the IC chip provides control signals to the switches 124 and 125 to disconnect the metal shell 120a from the ground portion 130 to float the metal shell 120a. In another example, detecting and controlling circuit in the IC chip provides control signals to the switches 124 and 125 to connect the metal shell 120a to the floating elements 126 and 127. In an embodiment, the floating elements 126 and 127 can include capacitors, coils, a combination of capacitors and coils, and the like that are not driven by an energy source.

In another embodiment, the switches 124 and 125 have a default state to float the metal shell 120a when no control signals are received, thus the detecting and controlling circuit in the IC chip does not need to provide control signals for the default state.

As shown in FIG. 3A, the metal shell 120a and its peripheral receptacle connection part 134 are in a floating state without being driven by any energy source. In the floating state, the metal shell 120A and its peripheral receptacle connection part 134 have a reduced effect on the operation of the antenna element 112, thus the antenna characteristics at the antenna element 112 can be improved.

As shown in FIG. 3B, when the USB plug 201 in connection with an external device (not shown) is plugged in the USB receptacle 120, the USB plug 201 and the USB receptacle 120 are mechanically and electrically coupled together to enable wired communication between the external device and the terminal device 100. Further, the states of the terminal pins 121 change, the state change can be detected by the detecting and controlling circuit in the IC chip mounted on the PCB 130. The detecting and controlling circuit then determines that the USB receptacle 120 enters the active state, and provides control signals to the switches 124 and 125 to connect the metal shell 120a to the ground portion 132 in the terminal device 100. Thus, the metal shell 120a and its peripheral receptacle connection part 134 have the ground potential.

When the metal shell 120a has the ground potential, the metal shell 120a functions as a shield to the terminal pins 121 to prevent external noise affecting the data transmission conducted via the terminal pins 121.

Figure 4:
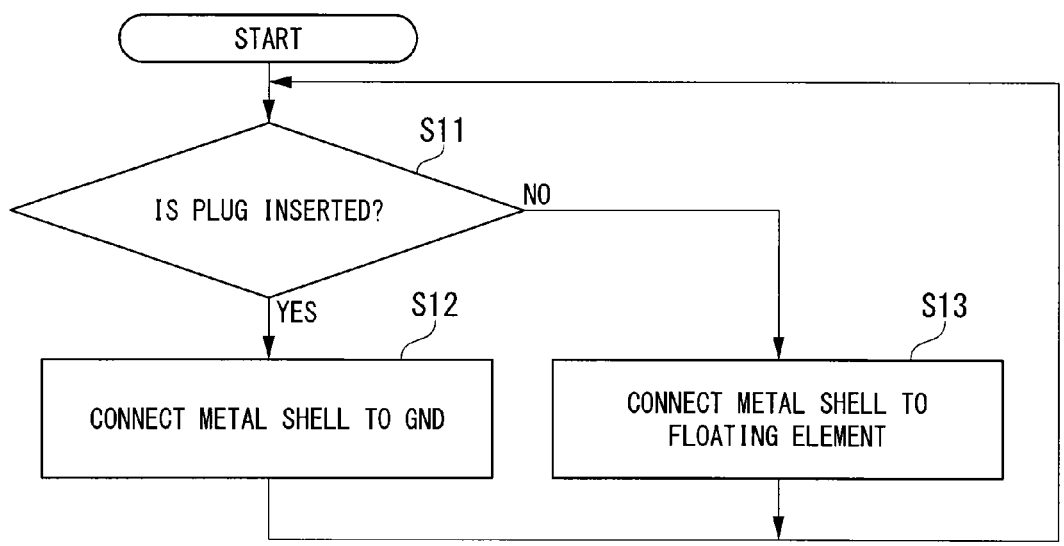
FIG. 4 shows a flow chart outlining a process according to an embodiment of the disclosure.

FIG. 4 shows a flowchart outlining a process for controlling the switches 124 and 125. In an example, the process is executed by the detecting and controlling circuit in the IC chip mounted on the PCB 130. The process starts and proceeds to S11.

At S11: a state of the USB receptacle 120 is detected. In an example, the states of the terminal pins 121 are indicative of an active state/an idle state of the USB receptacle 120. The terminal pins 121 are connected to the IC chip mounted on the PCB 130, and the states of the terminal pins 121 can be detected by the detecting and controlling circuit in the IC chip. Based on the states of the terminal pins 121, the detecting and controlling circuit detects the state of the USB receptacle 120. When the detecting and controlling circuit detects that the USB receptacle 120 is in the active state that a plug, such as the USB plug 201, is plugged in the USB receptacle 120 for wired data transmission, the process proceeds to S12; when the detecting and controlling circuit detects that the USB receptacle 120 is in the idle state without wired data transmission, the process proceeds to S13.

At S12: the metal shell 120a is connected to the ground portion 132. For example, the detecting and controlling circuit provides control signals to the switches 124 and 125 to connect the metal shell 120a to the ground portion 132. The process then returns to S11.

At S13: the metal shell 120a is connected to the floating elements 126 and 127. For example, the detecting and controlling circuit provides control signals to the switches 124 and 125 to connect the metal shell 120a to the floating elements 126 and 127 to float the metal shell 120a. Then, the process returns to S11.

It is noted that while the above description uses the USB receptacle 120 as example, the headset socket 150 can be configured in the similar manner as the USB receptacle 120, and the terminal device 100 can include other suitable interface component to be similarly configured as the USB receptacle 120.

Figure 5:
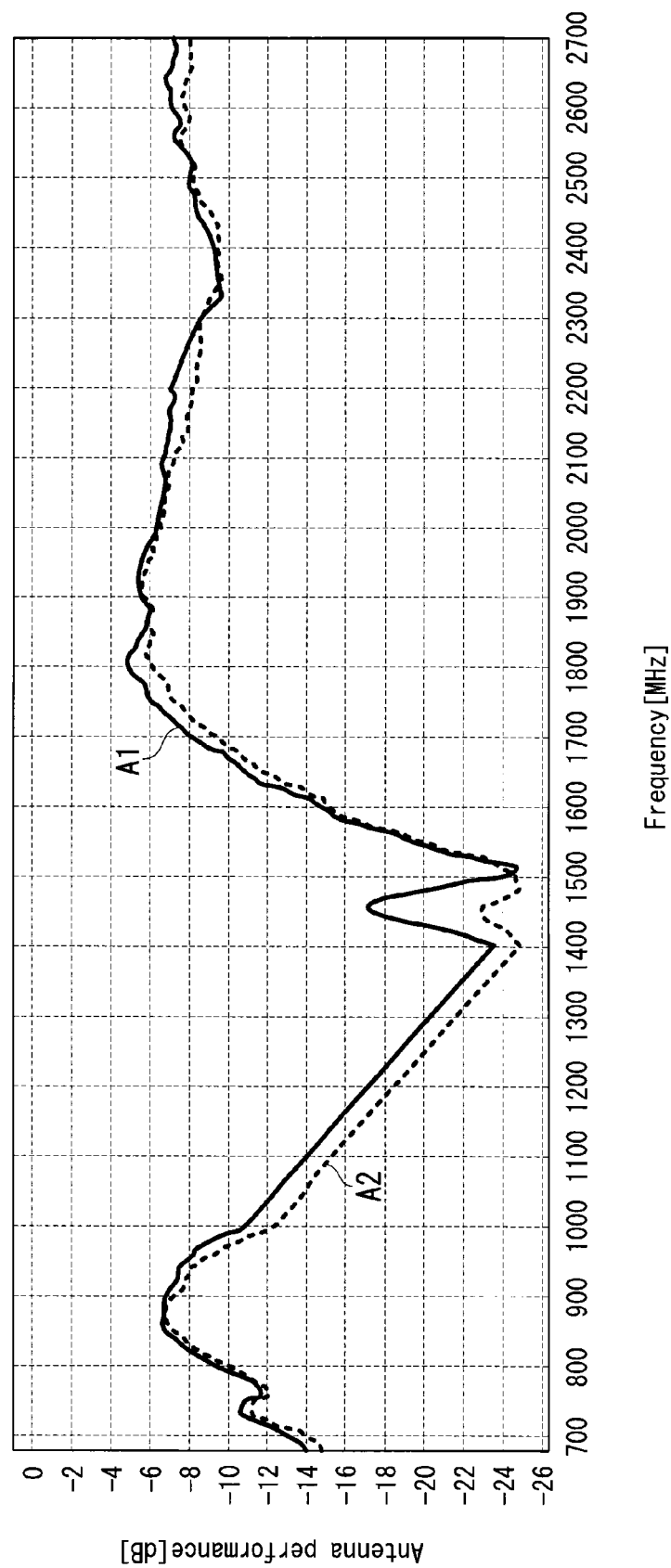
FIG. 5 shows a plot for receiving characteristics of the antenna element 112 according to an embodiment of the disclosure.

FIG. 5 shows a plot for receiving characteristics of the antenna element 112 according to an embodiment of the disclosure. In FIG. 5, the horizontal axis (X-axis) denotes to frequency in MHz, and the vertical axis (Y-axis) denotes an antenna performance measure (e.g., receiving sensitivity) in dB. For example, a larger number in the antenna performance measure indicates a better receiving sensitivity.

The plot includes a first curve A1 for the receiving characteristic of the antenna element 112 when the metal shell 120a of the USB receptacle 120 is in a floating state, and a second curve A2 for the receiving characteristic of the antenna element 112 when the metal shell 120a of the USB receptacle 120 has the ground potential.

As shown by the first curve A1 and the second curve A2, the antenna element 112 has a better receiving characteristic when the metal shell 120a of the USB receptacle 120 is in the floating state. For example, in the frequency bands of about 1,000 MHz, 1,800 MHz, 2200 MHz and 2,600 MHz, the receiving characteristic of the antenna element 112 has about 1 dB improvement for the case when the metal shell 120a of the USB receptacle 120 is in the floating state. Thus, floating the USB receptacle 120 improves receiving characteristics by the antenna element 112.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A terminal device comprising:
an antenna element mounted on a casing of the terminal device to transmit/receive electromagnetic waves;
an interface component configured to couple an external device with the terminal device for a wired transmission, the interface component comprising a metal shell configured to have a fixed potential state to shield the wired transmission from noise when the interface component is active for the wired transmission, and to have a floating state to avoid affecting the antenna element for transmitting/receiving electromagnetic waves when the interface component is idle;
a switch configured to connect the metal shell to a wound portion of the terminal device when the interface component is active, and disconnect the metal shell from the ground portion of the terminal device to float the metal shell when the interface component is idle; and
a detecting and controlling circuit configured to detect a state of the interface component and control the switch based on the state of the interface component.

2. The terminal device of claim 1, comprising:
a plurality of switches that are distributed and connected with the metal shell in parallel to connect the metal shell to the ground portion of the terminal device when the interface component is active, and disconnect the metal shell from the ground portion of the terminal device to float the metal shell when the interface component is idle.

3. The terminal device of claim 1, wherein the interface component is a USB receptacle for coupling a USB plug in connection with the external device.

4. The terminal device of claim 1, wherein the interface component is a headphone socket for coupling an audio plug.

5. The terminal device of claim 1, wherein the interface component is surrounded with isolation by a metal panel that forms the antenna element.

6. A method for use in a terminal device, comprising:
switching a metal shell for an interface component of the terminal device to a fixed potential to shield a wired transmission from noise when the interface component is active to conduct the wired transmission between the terminal device and an external device;
switching the metal shell away from the fixed potential to float the metal shell when the interface component is idle to avoid affecting an antenna element of the terminal device for transmitting/receiving electromagnetic waves;
switching the metal shell to a ground portion of the terminal device when the interface component is active;
switching the metal shell away from the ground portion of the terminal device to float the metal shell when the interface component is idle;
detecting a state of the interface component; and
switching the metal shell based on the state of the interface component.

7. The method of claim 6, comprising:
controlling a plurality of switches that are distributed and connected with the metal shell in parallel to connect the metal shell to the ground portion of the terminal device or disconnect the metal shell from the ground portion of the terminal device.

8. The method of claim 6, wherein the interface component is a USB receptacle for coupling a USB plug in connection with the external device.

9. The method of claim 6, wherein the interface components is a headphone socket for coupling an audio plug.

10. The method of claim 6, wherein the interface component is surrounded with isolation by a metal panel that forms the antenna element.

11. An electronic device comprising:
an antenna element configured to transmit/receive electromagnetic waves for wireless communication;
an interface component configured to couple an external device with the electronic device for wired communication, the interface component comprising a metal shell configured to have a fixed potential to shield the wired communication from noise when the interface component is active for the wired communication, and to have a floating state to avoid affecting the antenna element for the wireless communication when the interface component is idle;
one or more switches configured to connect the metal shell to a ground portion of the electronic device when the interface component is active, and disconnect the metal shell from the ground portion of the electronic device to float the metal shell when the interface component is idle; and
a detecting and controlling circuit configured to detect a state of the interface component and control the one or more switches based on the state of the interface component.

12. The electronic device of claim 11, wherein the interface component is a USB receptacle for coupling a USB plug in connection with the external device.

13. The electronic device of claim 11, wherein the interface component is a headphone socket for coupling an audio plug.

14. The electronic device of claim 11, wherein the interface component is surrounded with isolation by a metal panel that forms the antenna element.

* * * * *